Figure 1:
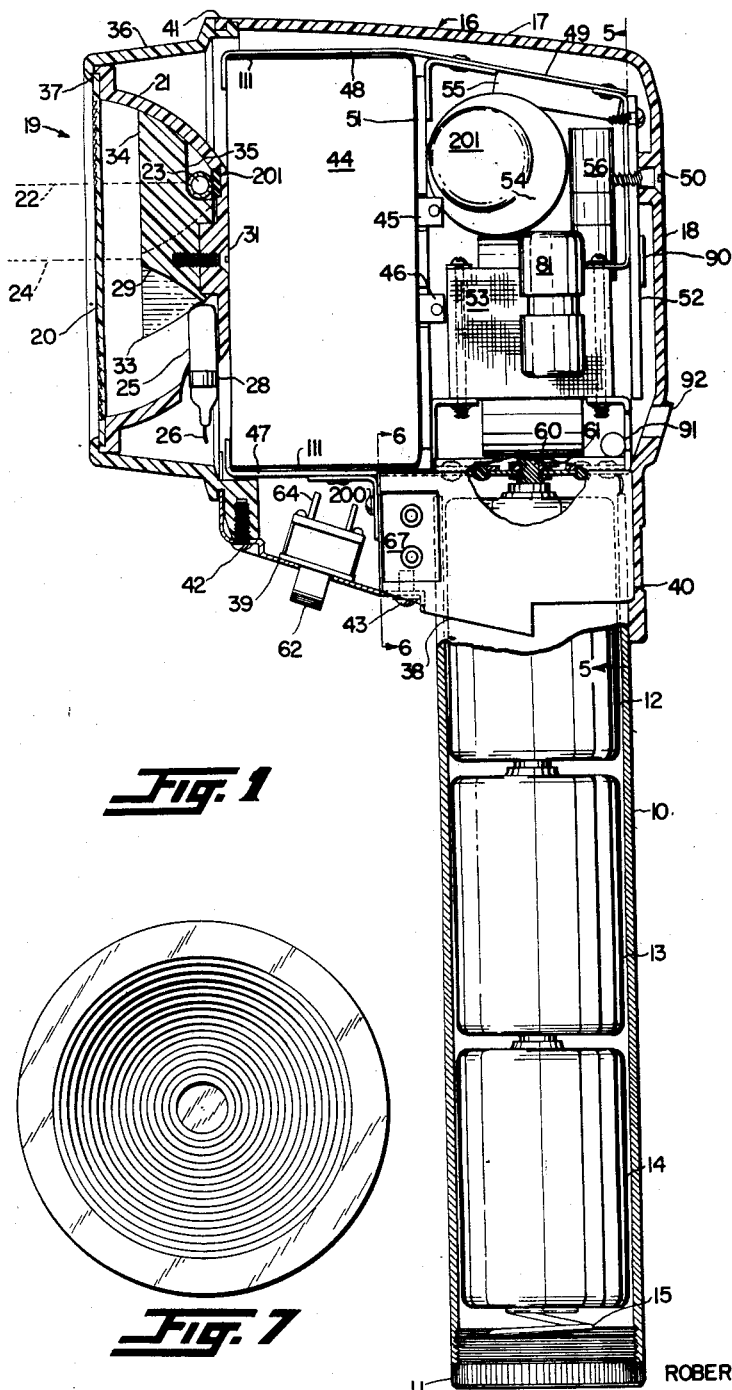

Sept. 20, 1960     R. D. KLUGE     2,953,675

PHOTOGRAPHIC FLASH UNIT

Filed Feb. 26, 1958     4 Sheets-Sheet 1

INVENTOR.
ROBERT D. KLUGE
BY
ATTORNEY

Sept. 20, 1960 R. D. KLUGE 2,953,675
PHOTOGRAPHIC FLASH UNIT
Filed Feb. 26, 1958 4 Sheets-Sheet 2

INVENTOR.
ROBERT D. KLUGE
BY
*Francis A. Sim*
ATTORNEY

Sept. 20, 1960    R. D. KLUGE    2,953,675
PHOTOGRAPHIC FLASH UNIT
Filed Feb. 26, 1958    4 Sheets-Sheet 4

INVENTOR.
ROBERT D. KLUGE
BY
Francis A. Linn
ATTORNEY

United States Patent Office 2,953,675
Patented Sept. 20, 1960

2,953,675

PHOTOGRAPHIC FLASH UNIT

Robert D. Kluge, Denver, Colo., assignor to Minneapolis-Honeywell Regulator Company, Minneapolis, Minn., a corporation of Delaware Filed Feb. 26, 1958, Ser. No. 717,642

6 Claims. (Cl. 240—1.3)

The present invention is concerned with an improved photographic flash unit and more particularly with a unitary electronic type photographic flash unit.

As is well known, the electronic type photographic flash unit utilizes a gas filled flash tube which is capable of emitting a brilliant flash of light when a high voltage capacitor is discharged through the flash tube. These flash units are either of the A.C. or the D.C. type. The A.C. type of flash unit is provided with an extension cord which connects to a source of atlernating voltage, such as available in a residence or in a photographic studio. This alternating voltage is stepped up to a high A.C. voltage by means of a step-up transformer and is then rectified to charge a capacitor, which capacitor is then selectively discharged through the flash tube to produce the flash of light.

The D.C. type electronic photographic flash unit may take one of two forms. The first of these forms involves a heavy, expensive, high voltage battery, for example a dry cell having a voltage of 450 volts. This battery charges the capacitor which is then selectively discharged through the flash tube. The second form of D.C. photographic flash unit utilizes a plurality of light-weight, inexpensive, low voltage batteries, commonly called D-type batteries or flashlight batteries. These particular D cells may be batteries especially adapted for photographic use or may be rechargeable type cells. In any event, these cells are rated at approximately 1½ volts per cell. With this type of unit, a vibrator is provided to convert the low D.C. voltage of the cells to a low voltage A.C. This low voltage A.C. is applied to a step-up transformer to produce a high A.C. voltage. This high A.C. voltage is then rectified and charges a capacitor which is connected to the flash tube and is adapted to be discharged through the flash tube to produce the brilliant flash of light.

It will be readily appreciated that it is only the two above described D.C. type electronic flash units which are adapted to be readily used in practically any situation. This is not true of the A.C. unit since the A.C. unit requires an extension cord connecting the unit to a source of alternating voltage, thereby limiting the use to which the A.C. unit may be put.

Prior art D.C. type electronic flash units of the first mentioned form using the high voltage battery have been constructed of a unitary construction such that a single unit is mounted at or near the camera providing a single structure including the camera bracket, the camera and the flash unit to be handled by the photographer. However, these units are inconvenient due to their weight. Also, a further disadvantage is the use of the expensive high voltage battery.

The prior art D.C. type electronic flash units of the second mentioned form utilize two separate parts to complete the unit. One of these parts is a light-weight head unit including a reflector and the photographic flash tube and perhaps the capacitor, while the other part is the high voltage power supply for the head unit. This high voltage power supply, utilizing the inexpensive and light-weight low voltage batteries, is generally strapped to the photographer, with a connecting cord leading from this high voltage power supply to the head unit, the head unit generally being mounted on the camera or the camera bracket.

It is the object of the present invention to provide an improved photographic flash unit of the type utilizing the inexpensive and light-weight D cells in which the D cells, a vibrator, a step-up transformer, a rectifier, a capacitor, and a flash tube are all contained in one relatively light-weight unit adapted to be mounted at or near the camera, thereby providing the convenience normally associated only with the heavier D.C. units incorporating the expensive high voltage batteries.

It is a further object of the present invention to provide an improved unitary photographic flash unit of the high voltage type which is easily carried and utilizes a plurality of D cells which are stacked end to end in a hollow handle member, the hollow handle member supporting on one end thereof a cup-shaped body member which has a shallow reflector located at the open end thereof. A photographic flash tube is provided for the reflector and a high voltage capacitor having a flat tubular shape whose diameter is substantially equal to the diameter of the body member is mounted within the body member and connected to the flash tube such that the axis of the capacitor substantially coincides with the axis of the reflector and the body member, with a vibrator, a step-up transformer, and a rectifier also mounted and electrically interconnected in the housing.

It is a further object of the present invention to provide an improved photographic flash unit of the high voltage type having a unitary construction including a hollow handle member which houses a plurality of low voltage batteries and has a cup-shaped body member mounted on one end of the handle member. The body member is provided mith a shallow parabolic reflector including an electronic flash tube having a pair of main electrodes and a triggering electrode. The body member likewise includes a flat tubular capacitor which is connected to the main electrodes of the flash tube and has a diameter substantially equal to the diameter of the housing. The housing also mounts a vibrator, a step-up transformer and a rectifier which are adapted to charge the capacitor. The housing also mounts a second capacitor adapted to be charged from the first mentioned capacitor and likewise mounts a triggering coil which is connected to an electrical outlet connector adapted to be connected to camera shutter contacts to discharge the second capacitor through a triggering coil, which coil is connected to the triggering electrode of the photographic flash tube to thereby cause said first mentioned capacitor to be discharged through the photographic flash tube to produce a brilliant flash of light.

It is a further object of the present invention to provide the novel combination of a shallow or flat reflector having a light source and a Fresnel lens so constructed and arranged as to provide a conical angle of light related to the viewing angle of most camera lens.

Figure 2:
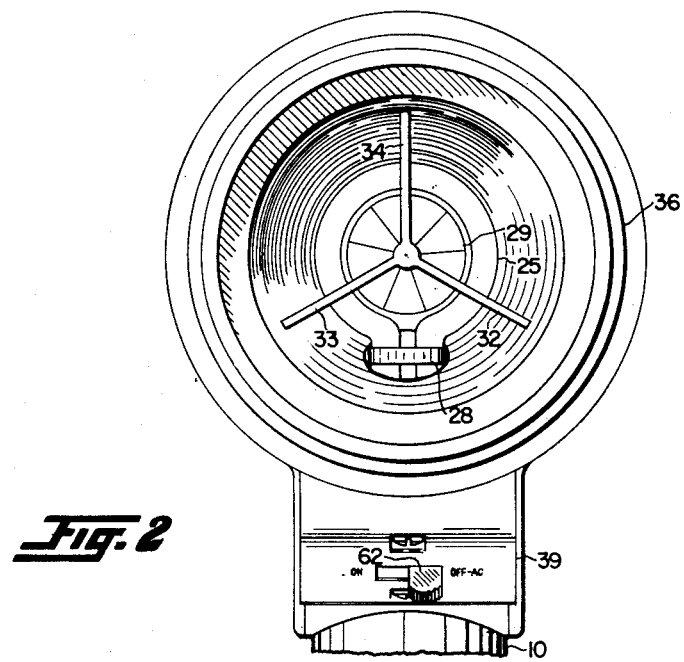
Figure 3:
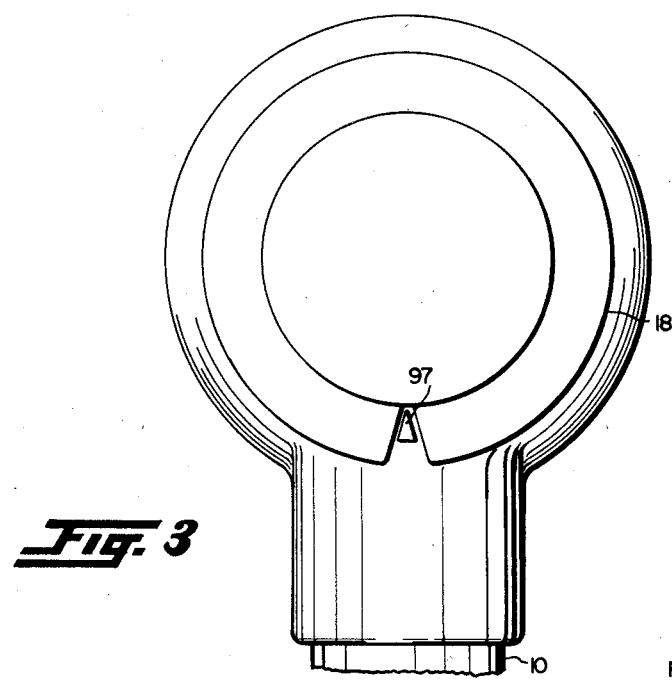
Figure 4:
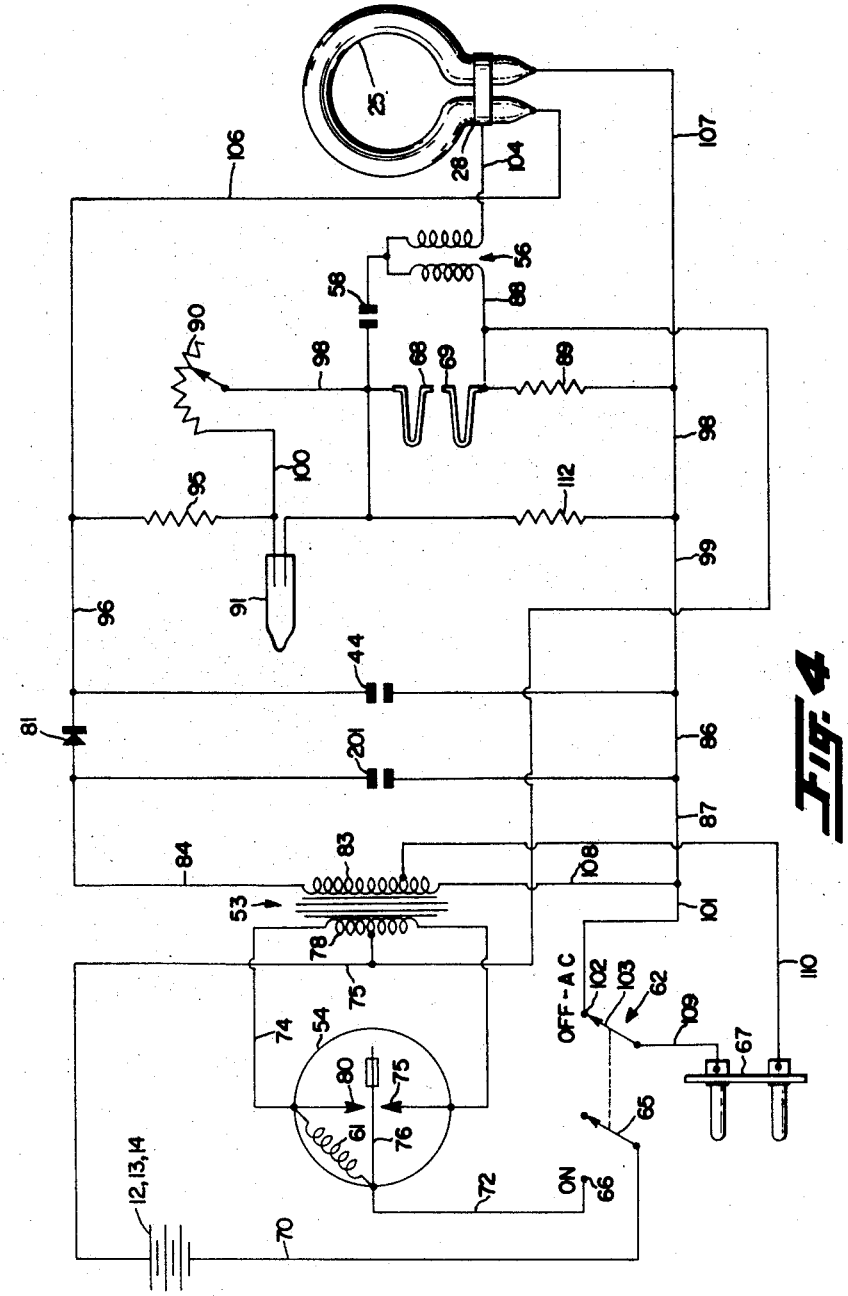
Figure 5:
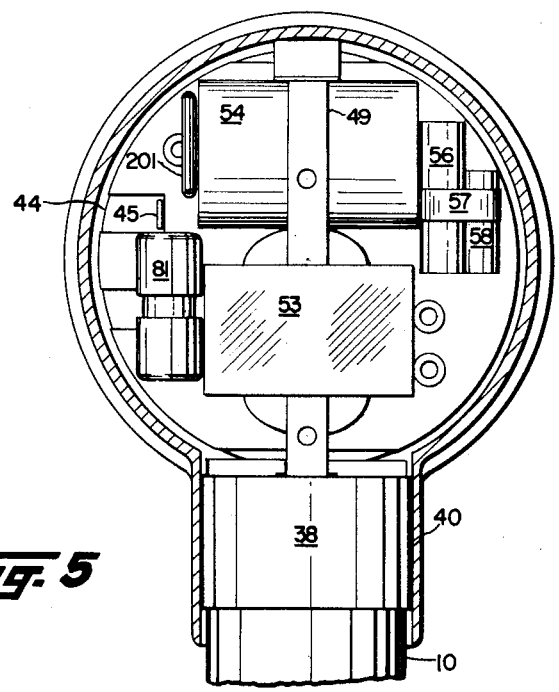
Figure 6:
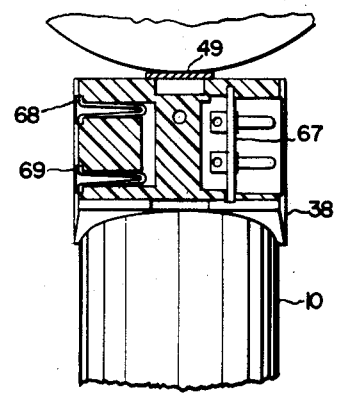

These and other objects of the present invention will be apparent to those skilled in the art upon reference to the following specification, claims and drawing, of which Figure 1 is a side view of the improved photographic flash unit, showing portions of the head unit housing and of the handle member broken away, electrical lead wires have not been shown, Figure 2 is a front view of the flash unit of Figure 1, showing the handle member broken away and showing the circular flash tube in relation to the reflector, the Fresnel lens of Figure 1 being omitted, Figure 3 is a back view of the flash unit of Figure 1, likewise showing the handle member broken away, Figure 4 is a schematic showing of the electronic flash unit, showing the electrical interconnection of the components, Figure 5 is a section view of the unit of Figure 1, taken along the line 5—5, again eliminating the electrical lead wires, Figure 6 is a section view of the unit of Figure 1, taken along the line 6—6, and Figure 7 is a front view of the Fresnel lens of Figure 1.

Referring specifically to Figure 1, the reference numeral 10 designates a tubular handle member. This handle member is preferably constructed of a metal and is open at the upper end thereof and provided with a metal cap 11 which closes the lower end. A plurality of low voltage D.C. batteries, designated by the reference numerals 12, 13 and 14, are stacked end to end within the handle member and one electrical contact to this source of D.C. voltage is provided by means of a metal spring 15 positioned in the cap 11. These low voltage batteries 12–14 are preferably the D size low voltage batteries having a voltage of approximately 1½ volts each. These batteries may be the conventional flash light batteries, the special batteries constructed for photographic purposes, or the rechargeable type D cells.

Handle member 10 has approximately the same diameter as the diameter of the batteries and provides a convenient handle for holding the flash unit. Furthermore, a clamp of a quick release type, not shown, may be attached to the handle 10 to allow mounting the flash unit on a camera bracket, thereby providing a convenient and compact structure for the photographer including the camera, the camera bracket and the flash unit.

The reference numeral 16 designates the head unit of the flash gun and this head unit includes the housing 17 having a back or end plate 18. This housing is generally cup-shaped and is provided with an open end, designated by the reference numeral 19, this open end being at the opposite end of the housing from the back plate 18. The open end of the housing is closed by a transparent or translucent plate or lens 20 in the form of a Fresnel lens, also shown in Figure 7. This member 20 allows light to leave the open end of the flash unit and at the same time prevents the photographer from coming in contact with the high voltage electrical components immediately inside of the member 20.

The reference numeral 21 designates a shallow reflector in the form of a parabola. While this reflector may take a variety of shapes, it is constructed within the teachings of this invention to be a shallow or flat reflector to thereby require a minimum amount of space within the head unit 16. This must be accomplished without impairing the light pattern furnished from the flash unit. Furthermore, it is necessary for good photography that the light be distributed evenly over an area which includes a conical angle of approximately 60°, this corresponding to the viewing angle of most camera lens. To accomplish this, it has been found desirable to use a parabolic reflector which is formed as a surface of revolution wherein a parabola having a major axis identified by the broken line 22 and having a focal point at 23 is revolved about the axis 24 to form a generally donut shaped reflector. As can be seen in Figure 1, the reflector has a diameter substantially equal to the diameter of the head unit housing.

A high voltage flash tube, designated by the reference numeral 25 is mounted within this reflector such that the circular glass envelope of this flash tube is positioned to coincide with the locus of the focal point 23 as its parabola is revolved about the axis 24. This flash tube 25 is a gas filled device provided with a pair of main current conducting electrodes, one of which is shown in Figure 1 and identified by the reference numeral 26. In Figures 1 and 4 the reference numeral 28 identifies a triggering electrode which is adapted to initiate discharge through the flash tube, as will be described.

The Fresnel lens 20 is provided to aid in the distribution of the light from flash tube 25 into this conical angle which is related to the viewing angle of most camera lens. The novel combination of this shallow reflector and the Fresnel lens 20 along with the arrangement of flash tube 25 provides the desirable light distribution.

The flash tube 25 is held in position within reflector 21 by means of a member 29 having a conical surface and three radiating fins. This conical member is attached to reflector 21 by means of a bolt 31. Referring to Figure 2, this conical member can be seen to be provided with three radiating fins, identified by the reference numerals 32, 33 and 34. These three fins are positioned at equally spaced intervals about the member 29 and each fin is provided with a cut away portion, designated by the reference numeral 35 in Figure 1. This cutaway portion receives the flash tube 25 and holds this flash tube in position with respect to the reflector 21. Reflector 21 is provided with three pockets, one of which is opposite each of the fins 32, 33 and 34. The reference numeral 201 of Figure 1 designates one of three rubber cushions contained one in each of the pockets.

Considering once again the housing 17 of Figure 1, this housing consists of a ring assembly 36 which is provided with an annular overhanging lip 37 to hold the reflector and the member 20 in position. The housing 17 is completed by a member 38 and a switch plate 39. The member 38 is rigidly attached to the upper end of the handle member 10 and is provided with an extending ridge 40 which fits into a recess provided in the back plate 18 of the housing 17. The members 17, 36 and 38 are all preferably constructed of an insulating plastic material. Upon assembling the unit, the member 36 is placed in position such that the tongue and groove assembly, identified by the reference numeral 41, is in proper alignment. The handle member 10 is then positioned with member 38 having its ridge 40 in position in the back plate 18. The switch plate 39 is then placed in position and the bolts 42 and 43 are tightened, completing the assembly.

Thus far, the basic exterior structure of the flash gun of Figure 1 has been described. The space remaining in the head unit housing 17 between its back plate 18 and the back surface of the reflector 21 must house the remaining components of an electronic flash system. This system of necessity requires a vibrator to convert the relatively low D.C. voltage furnished by the batteries 12–14 to a low A.C. voltage. This low A.C. voltage is then applied to a step-up transformer and converted to a high A.C. voltage. This high A.C. voltage is rectified and applied to a high voltage electrolytic capacitor. Furthermore, a triggering circuit must be provided for the flash tube 25. This triggering circuit includes, among other components, a triggering capacitor and a triggering transformer. In order to overcome the problem of mounting these various components within a rather confined space to thereby provide a D cell type electronic flash gun which is included in a single physical unit, the novel concept of providing a flat electrolytic capacitor having substantially the same diameter as the head unit 17 and positioned within this head unit such that the axis of this capacitor coincides or is parallel with the axis of the head unit was originated. This capacitor is designated by the reference numeral 44, having terminals 45 and 46. In one embodiment of the present invention a 400 mfd. 450 volt capacitor was constructed having the shape shown in Figures 1 and 4.

The capacitor 44 is mounted between two finger members 47 and 48 provided on a mounting bracket designated generally by the reference numeral 49, the capacitor 44 being provided with insulating tape 111 at this mounting surface. Mounting bracket 49 is preferably constructed of metal and is generally U-shaped, being attached to the housing 17 by means of the screw 50 in the back plate 18 of the housing and to the member 38 by means of screw 200. This bracket 49 supports a pair of insulating cards 51 and 52 which mount electrical terminals, as shown more clearly in Figure 4. Also, as seen in Figure 1, with capacitor 44 in assembled position, the capacitor abuts the back surface of reflector 21, holding reflector 21 and member 20 in position.

Referring to Figure 1 again, the reference numeral 53 designates a step-up transformer, and the reference numeral 54 designates a vibrator. Both of these units 53 and 54 are attached to the mounting bracket 49. The transformer 53 is attached by means of bolts, whereas the vibrator 54 is attached by means of a mounting block 55. Vibrator 54 may be of the mechanical or the electronic type.

The reference numeral 81 designates a rectifier and the reference numeral 201 a buffer capacitor. The reference numeral 56 designates a trigger coil or transformer. Referring to Figure 5, it can be seen that this transformer 56 is connected by means of a mounting band 57 to a triggering capacitor 58, which capacitor is hidden in Figure 1.

Electrical contact to the center post of the stacked batteries 12 through 14 is made by means of a contact button designated by the reference numeral 60. This contact button is supported on the bracket 49 but insulated therefrom, and is provided with a contact tab 61.

The particular apparatus shown in Figure 1 operates either on the low voltage D.C. sources 12–14 or may be operated from an A.C. line when used with a connecting cord connecting the unit to a source of alternating voltage. As shown in Figure 2, a switch 62 is provided having two positions, the right hand position in Figure 2 being the "Off" and "A.C." position and the left hand position being the "On" position. This same switch 62 is shown in Figure 4. The reference numeral 67 of Figures 1, 4 and 6 designates a connector which is adapted to be connected to a source of A.C. voltage. As can be seen in Figure 6, this connector is mounted in one side of the member 38 which in turn is mounted on top of the handle unit 10.

The reference numerals 68 and 69 of Figures 4 and 6 designate a further connector which is adapted to connect to a shutter cord, which cord is connected to the shutter contacts of a camera. This cord and the shutter contacts of the camera are the means by which the flash tube 25 of the flash unit is energized to produce the flash of light in synchronism with the action of the shutter of the camera.

The construction of the unit including the A.C. connector 67 and the shutter cord connector 68—69 is seen more clearly in Figure 6. In this figure it can be seen that the members 67, 68 and 69 are positioned in chambers formed in member 38. The electrical conductors completing a circuit to the connectors are not shown in Figure 6.

The operation of the improved photographic flash unit will now be described with reference to Figure 4. When the flash unit is to be used with the low voltage sources 12–14 as the source of voltage, the switch 62 is moved to the "On" position. This completes a circuit energizing vibrator 54 and this circuit can be traced from source 12–14 (handle 10 of Figure 1) through conductor 70, switch blade 65 and contact 66, conductor 72, coil 61 of vibrator 54, conductor 74, the upper half of primary winding 78, and conductor 75 to the other side of source 12–14 (tab 61 of Figure 1). Energization of coil 61 causes reed 76 to engage contact 80. This shorts coil 61 and the reed 76 then moves to engage contact 75. Vibrator 54 operates in this manner to apply a voltage, first to the upper half of the primary winding of transformer 53 and then to the lower half of this primary winding. This action induces a high A.C. voltage in the secondary winding 83 of this transformer 53. This A.C. voltage is applied to a series circuit including capacitor 44 and a rectifier 81. This series circuit can be traced from the upper terminal of the secondary winding through conductor 84, rectifier 81, capacitor 44, and conductors 86 and 87 to the lower terminal of this secondary winding. This series circuit causes capacitor 44 to be charged to a high value D.C. voltage. A second capacitor 58 is connected across this main capacitor 44 in a circuit which can be traced from the upper plate of capacitor 44 through conductor 96, resistor 95, conductor 100, a portion of rheostat 90, conductor 98, capacitor 58, a portion of coil 56, conductor 88, resistor 89 and conductors 98 and 99 to the lower plate of capacitor 44. This circuit places a charge on capacitor 58. The state of charge on capacitor 58 is indicated by the lighting of neon bulb 91 which is connected in parallel therewith through a resistor 112. This bulb 91 is shown in Figure 1 and is viewed through a window 92 provided in the backwall 18 of the housing.

When it is desired to flash the flash tube 25, the camera shutter circuit is completed by completing a circuit between the contactor members 68 and 69. This circuit shunts the above mentioned portion of coil 56 across capacitor 58 and causes capacitor 58 to discharge through the portion of the coil 56. A high triggering voltage is induced in the remaining portion of winding 56. The right hand end of the winding is connected by means of conductor 104 to the triggering electrode 28 of the flash tube 25. This high voltage causes the flash tube to break down and the capacitor 44 is therefore discharged through the flash tube 25, the main electrodes of this flash tube being connected to the terminals of the capacitor by means of conductors 106 and 107.

If it is desired to utilize the improved flash gun with an A.C. source, switch 62 is placed in the "Off-A.C." position. If a source of alternating voltage is now connected to the connector 67, an A.C. voltage is applied to a portion of the secondary winding 83 of transformer 53. This can be seen by tracing a circuit from the lower terminal of this secondary winding through conductors 108 and 101, contact 102 and switch blade 103 and conductor 109 to one side of the connector 67. The other side of the connector 67 connects by means of a conductor 110 to the tap of the secondary winding of transformer 53. This connection induces a high alternating voltage across the complete secondary winding and this alternating voltage is applied to the series circuit including the capacitor 44 and the rectifier 81, much in the same manner as when the flash unit is used with the source 12–14.

From the above description it can be seen that I have originated an improved single unit electronic photographic flash unit utilizing low voltage or D cell type batteries. Other modifications of this invention will be apparent to those skilled in the art and it is intended that the scope of the present invention be limited solely by the scope of the appended claims.

I claim as my invention:

1. An electronic photographic flash unit of the single unit type, comprising; a hollow metal tubular handle member having an open end at one end thereof and having a removable cap closing the other end thereof, said handle member being adapted to receive a plurality of D type low voltage batteries stacked end to end within said handle member; a hollow cup-shaped head unit housing having an end wall and an open end, a sheet of transparent material enclosing the open end of said housing, a shallow parabolic reflector mounted adjacent the open end of said housing, a high voltage gas filled flash tube mounted in relation to said reflector so that when said flash tube is energized light is emitted out of the open end of said housing through said sheet to illuminate a subject to be photographed; a metallic mounting bracket, means mounting said bracket on the end wall of said housing, said bracket including a pair of oppositely disposed fingers, a contact button electrically insulated from and mounted on one finger of said bracket and disposed to make electrical contact with the center terminal of the batteries; a high voltage electrolytic capacitor in the form of a short tube having a diameter substantially equal to the inner diameter of said housing, means mounting said capacitor between the fingers of said bracket to hold said capacitor with the axis thereof substantially in alignment with the axis of said reflector and said housing; a rectifier, a step-up transformer, a vibrator, means mounting said transformer and vibrator on said bracket; and circuit means interconnecting said rectifier, transformer, vibrator, flash tube and capacitor to said handle member and said contact button to convert the low voltage D.C. of said batteries to a low voltage A.C. and then to a high voltage A.C. which is rectified to charge said capacitor to a high voltage capable of discharging through said flash tube to produce a brilliant flash of light.

2. A unitary electronic flash unit for use to illuminate a subject to be photographed, comprising; a tubular handle member adapted to hold a plurality of D-type batteries stacked end to end within said handle member; a cup-shaped head unit housing mounted on said handle member, a shallow parabolic reflector having a diameter substantially equal to the diameter of said housing positioned adjacent the open end of said housing, a high voltage flash tube having a pair of main electrodes and a triggering electrode, said flash tube being mounted within said reflector; a flat tubular electrolytic capacitor having a diameter substantially equal to the diameter of said housing, said capacitor being mounted within said housing such that the axis of said housing substantially coincides with the axis of said reflector and said capacitor; means electrically connecting said capacitor to the main electrodes of said flash tube, voltage tube interruptor means and a step-up transformer mounted in said housing, means adapted to electrically connect said interruptor means and said transformer to the batteries to produce a high A.C. voltage; a rectifier mounted in said housing, means connecting said rectifier to said transformer and said capacitor to charge said capacitor to a high D.C. voltage; an electrical outlet connector mounted on said housing and adapted to receive a shutter cord connected to shutter contacts of a camera, a trigger coil mounted in said housing, means electrically connecting said trigger coil to the triggering electrode of said flash tube; a second capacitor mounted in said housing, means electrically connecting said second capacitor to said first capacitor to charge said second capacitor, and means including said electrical outlet connector connecting said second capacitor to said trigger coil to thereby discharge said second capacitor through said trigger coil under the control of the camera shutter contacts to produce a high triggering voltage to trigger said flash tube and thereby cause said first named capacitor to discharge through said flash tube to produce a brilliant flash of light.

3. In combination, a cup shaped head unit housing, a shallow doughnut shaped reflector formed as a surface of revolution of a curve having a focal point and an axis disposed from the axis of revolution, said reflector having a diameter substantially equal to the diameter of said head unit housing means mounting said reflector within said head unit housing at the open end thereof, a circular gas filled flash tube mounted in said reflector at the locus of the focal point of said curve so that when said flash tube is energized, light is projected out of the open end of said head unit housing, a flat tubular electrolytic capacitor having a diameter substantially equal to the diameter of said head unit housing, means connecting said capacitor to said flash tube, means mounting said capacitor within said head unit housing with the axis of said capacitor parallel to the axis of said housing, power supply means, means connecting said power supply means to said capacitor and said flash tube, and means mounting said power supply means within said housing.

4. A single unit electronic photographic flash unit of the D-cell type, comprising; a hollow tubular handle member adapted to hold a plurality of D-cell batteries stacked end to end and to function as a handle for the flash unit, a cup-shaped head unit housing having a bottom surface from which an annular side wall extends to define an opening opposite said bottom surface, mounting means including said side wall for mounting said head unit on one end of said handle member, a shallow reflector having a diameter substantially equal to the diameter of the opening in said head unit, means mounting said reflector at the opening in said head unit; a gas filled flash tube mounted in said reflector so that when said flash tube is energized, light is projected out of the opening of said head unit; a flat tubular electrolytic capacitor having a diameter substantially equal to the diameter of said head unit; voltage transforming means including voltage interrupter means, a transformer and rectifier means connected in a series type electrical circuit; a mounting bracket mounted on the bottom surface of said head unit, means mounting said voltage transforming means on said mounting bracket immediately adjacent said one end of said handle member, means mounting said capacitor on said mounting bracket, means connecting said capacitor to said flash tube and to said rectifier means, and means connecting said voltage interrupter means to terminal means adapted to connect with the D-cell batteries.

5. A relatively light weight and unitary electronic photographic flash unit of the low voltage battery type, comprising; a hollow tubular handle member adapted to contain a plurality of low voltage batteries stacked end to end, a cup-shaped head unit housing mounted on one end of said handle member such that the axis of said housing is substantially perpendicular to the axis of said handle, a shallow reflector having a diameter substantially equal to the diameter of said head unit housing mounted in the open end of said head unit housing, a gas filled flash tube mounted in said reflector so that when said flash tube is energized light is projected out of the open end of said head unit housing along the axis thereof, a flat tubular electrolytic capacitor having a diameter substantially equal to the diameter of said head unit housing, a support bracket mounting said capacitor within said head unit housing with the axis of said capacitor parallel to the axis of said housing, power supply means including a rectifier and voltage transformer means, means mounting said power supply means on said support bracket in close proximity to said one end of said handle member, and circuit means interconnecting the above mentioned components so that the low D.C. voltage of the low voltage batteries is converted to a high A.C. voltage and then rectified by said rectifier and stored in said electrolytic capacitor to be discharged through said flash tube to produce a brilliant flash of light.

6. A single unit electronic flash unit, comprising; a hollow tubular handle member, said handle member being adapted to hold a plurality of low voltage batteries stacked end to end within said handle member, a cup-shaped head unit housing having an end wall and an open end covered by a transparent window, means mounting said housing on one end of said handle member, a shallow parabolic reflector having a diameter substantially equal to the diameter of said housing mounted within said housing and behind said window adjacent the open end of said housing, a high voltage flash tube mounted within said reflector, a mounting bracket fixed to the end wall of said housing, a flat tubular high voltage electrolytic capacitor having a diameter substantially equal to the diameter of said housing, means mounting said capacitor on said mounting bracket directly behind said reflector such that the axis of said reflector, said capacitor and said housing are parallel, voltage transforming means, means mounting said voltage transforming means on said mounting bracket adjacent said one end of said handle member, and circuit means interconnecting the above mentioned electrical components to convert the low D.C. voltage of the batteries to a high D.C. voltage and charge said capacitor to a high D.C. voltage such that said capacitor may be selectively discharged through said flash tube to produce a brilliant flash of light which is emitted from the open end of said housing.

References Cited in the file of this patent

UNITED STATES PATENTS

| | | |
|---|---|---|
| 2,358,796 | Edgerton | Sept. 26, 1944 |
| 2,550,698 | King et al. | May 1, 1951 |
| 2,596,887 | Brundage | May 13, 1952 |
| 2,624,831 | Farber | Jan. 6, 1953 |
| 2,748,259 | Friedman | May 29, 1956 |
| 2,811,907 | Hyzer | Nov. 5, 1957 |
| 2,856,562 | Grimm | Oct. 14, 1958 |
| 2,868,958 | Bounds | Jan. 13, 1959 |